(12) United States Patent
Holt et al.

(10) Patent No.: US 8,087,699 B2
(45) Date of Patent: *Jan. 3, 2012

(54) ASSEMBLY FOR ATTACHING A CLAMP TO A HOSE

(75) Inventors: Ben F. Holt, Lexington, TN (US); Christopher W. Smith, Lexington, TN (US); Andrew Norman, Paris, TN (US); John E. Mobley, Henderson County, TN (US)

(73) Assignee: Fluid Routing Solutions, Inc., Southfield, MI (US)

( * ) Notice: Subject to any disclaimer, the term of this patent is extended or adjusted under 35 U.S.C. 154(b) by 855 days.

This patent is subject to a terminal disclaimer.

(21) Appl. No.: 12/105,541

(22) Filed: Apr. 18, 2008

(65) Prior Publication Data

US 2008/0201913 A1    Aug. 28, 2008

Related U.S. Application Data

(63) Continuation-in-part of application No. 11/285,687, filed on Nov. 22, 2005, now Pat. No. 7,422,245.

(51) Int. Cl.
*B65D 57/00* (2006.01)
*F16L 57/00* (2006.01)
*A44B 11/25* (2006.01)

(52) U.S. Cl. ......... 285/23; 285/252; 285/253; 24/274 R; 24/279; 24/304

(58) Field of Classification Search .................. None
See application file for complete search history.

(56) References Cited

U.S. PATENT DOCUMENTS

| | | | |
|---|---|---|---|
| 3,279,014 A | 10/1966 | Fischer | |
| 3,365,218 A | 1/1968 | Denyes | |
| 4,151,926 A | 5/1979 | Kinney et al. | |
| 4,197,620 A | 4/1980 | Heuchert | |
| 5,185,913 A | 2/1993 | Camp et al. | |
| 5,456,784 A | 10/1995 | Cogdill et al. | |
| 6,773,037 B2 | 8/2004 | Spurgat | |
| 2005/0052020 A1 | 3/2005 | Butler | |

FOREIGN PATENT DOCUMENTS

WO    WO0242675    5/2002

*Primary Examiner* — Jack W. Lavinder
(74) *Attorney, Agent, or Firm* — Marshall & Melhorn LLC

(57) ABSTRACT

Disclosed is a cover bracket for holding a clamp having a screw housing in place on a hose without contaminating the screw housing with adhesive. The cover bracket includes a cover portion configured to receive a screw housing and a first runner and a second runner connected to one another by the cover portion. Each of the first and second runners includes a hose contacting surface and the first runner includes a channel in the hose contacting surface. The channel including an aperture extending through the first runner to an exterior of the first runner. Also disclosed is a method for attaching the cover bracket to the hose having the clamp thereon.

17 Claims, 2 Drawing Sheets

ASSEMBLY FOR ATTACHING A CLAMP TO A HOSE

RELATED APPLICATIONS

This application is a continuation-in-part of U.S. patent application Ser. No. 11/285,687 filed Nov. 22, 2005 now U.S. Pat. No. 7,422,245.

BACKGROUND

The present invention relates generally to an assembly that includes a fastener for attaching a clamp to a hose.

In an effort to reduce cost and improve manufacturing efficiency, automotive OEM customers are asking suppliers to provide assemblies containing multiple components. These requests eliminate packaging and simplify handling requirements for the OEM customer, thus reducing costs and improving manufacturing efficiency. One common request is to attach pre-positioned clamps to fuel fill hoses. This allows a single operator to install a relatively large assembly. In addition, where space limitations exist, the inclusion of pre-attached, pre-positioned clamps eliminates the need for the operator to hold the clamp in place during installation. This is particularly helpful in instances in which it is not practical for the operator to hold the clamp due to space constraints.

Current methods for attaching clamps include directly bonding the clamp to the hose using an appropriate adhesive, a tape, a mechanical clip, a rivet, a vulcanized material patch, or a plastic housing, see, for example, WO 02/42675. U.S. Pat. No. 5,456,784 to Cogdill et al. discloses a tubular arrangement of elastic material for securing a clamping means to the end of a hose. U.S. Pat. No. 5,185,913 to Campo et al. discloses a fastening member having recesses therein for holding a clamp on the end of a hose. U.S. Pat. No. 3,365,218 to Denyes discloses various means for fastening a clamping member to a hose. Each of the foregoing approaches has advantages and disadvantages. For example, direct bonding, tape, and the use of a vulcanized patch are susceptible to oil and other contaminants and can result in sporadic performance problems. The rivet and mechanical clip attachments have raised concerns related to connection integrity and emission levels. Specifically, contamination of the screw mechanism with misplaced or excess adhesive may lead to a false installation force, e.g., the installer believes that the hose is more tightly installed than it actually is, due to the turning force required to overcome any interference created by the adhesive.

SUMMARY

An assembly is provided for attaching a clamp to a hose. The assembly includes a hose, a clamp, a cover bracket and an adhesive. The clamp includes a band and a screw housing mounted to the band with a screw disposed in the screw housing. The screw engages the band to tighten the band and draw the band around the hose. The cover bracket has an opening for receiving the screw housing. The cover bracket includes a cover portion for the screw housing and a base portion extending from the cover portion. The base portion includes a bonding surface for attaching the cover bracket to the hose and a channel located between the bonding surface and the band. The adhesive is applied to the bonding surface such that the cover bracket is adhered to the hose without interfering with the clamp operation.

In another aspect, a cover bracket is provided for attaching a clamp to a hose. The cover bracket is for holding a clamp having a screw housing in place on a hose without contaminating the screw housing with adhesive. The cover bracket includes a cover portion configured to receive a screw housing and a first runner and a second runner connected to one another by the cover portion. Each of the first and the second runners includes a hose contacting surface and the first runner includes a channel in the hose contacting surface. The channel has an aperture that extends through the first runner to an exterior of the first runner. The aperture may extend to an exterior surface of the runner opposite the hose contacting surface.

In another aspect, a method is provided for attaching a cover bracket to a hose and clamp assembly. The method includes providing a hose with a clamp having a band and a screw housing positioned thereon, providing a cover bracket, placing the cover bracket over the screw housing so that the first and second runners are in contact with the hose, and feeding an adhesive through the aperture so that the adhesive fills the channel and contacts the hose to adhere the first or second runner to the hose. The cover bracket includes a cover portion configured to receive a screw housing and a first runner and a second runner connected to one another by the cover portion. Each of the first and the second runners includes a hose contacting surface and the first runner includes a channel in the hose contacting surface. The channel has an aperture that extends through the first runner to an exterior of the first runner.

BRIEF DESCRIPTION OF THE SEVERAL VIEWS OF THE DRAWINGS

The objects, features and advantages of the invention will appear more fully hereinafter as the description thereof proceeds, reference being made to the accompanying drawings in which.

DETAILED DESCRIPTION

Figure 1:
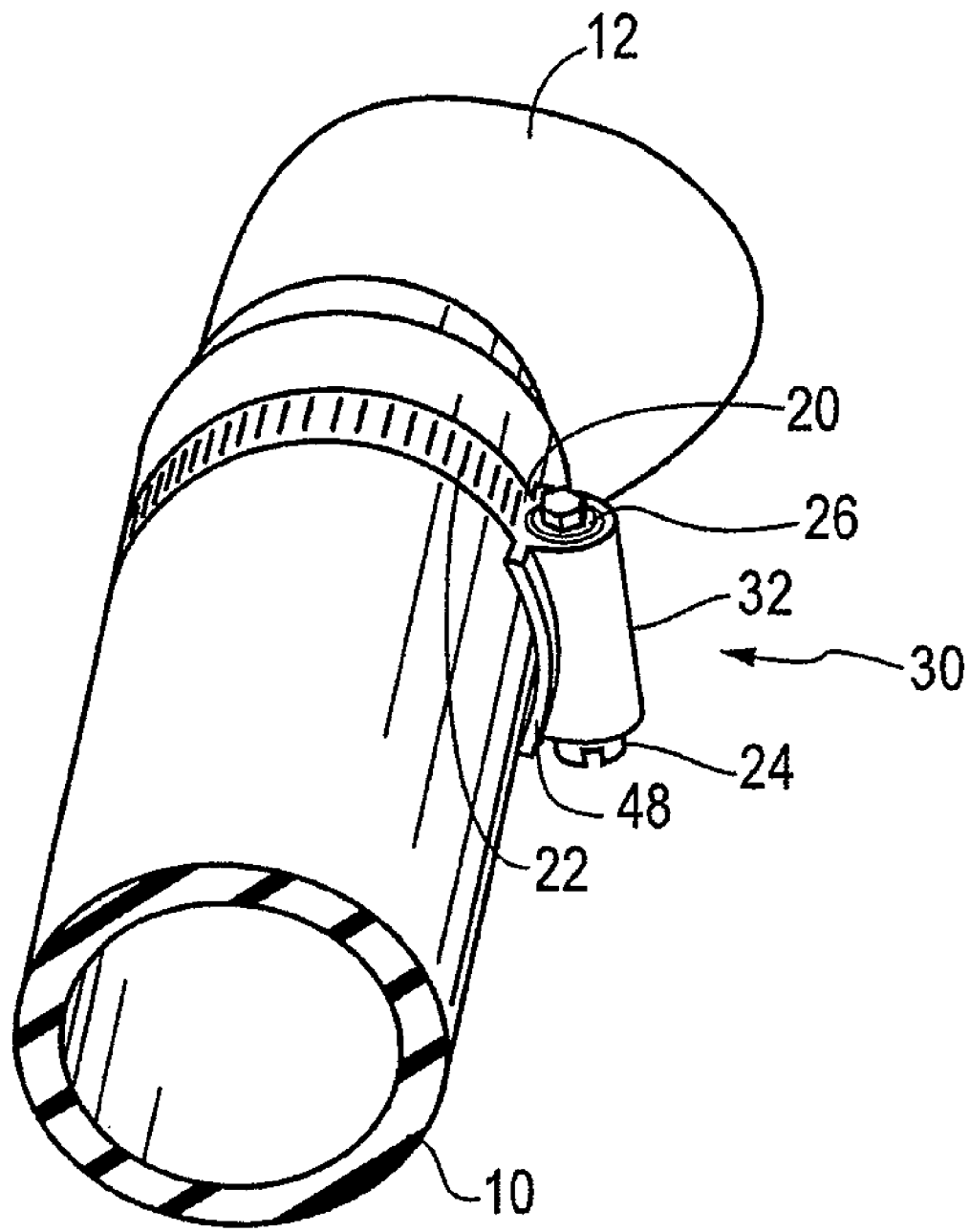
FIG. 1 illustrates a perspective view of a bracket in accordance with one embodiment of the invention assembled with the hose.

Referring now to the drawings, in particular FIG. 1, there is illustrated by way of example a conventional automotive hose 10 including a screw clamp mechanism 20. FIG. 1 illustrates a cover bracket 30 in accordance with one embodiment of the present invention in place over the clamp 20. More specifically, the clamp 20 includes a slotted band 22, a screw 24 and a screw housing 26. As the screw 24 is turned, the threads of the screw 24 engage the slots 28 on the band 22 of the clamp 20. This draws the band 22 around the hose 10 thereby tightening the hose onto a fixture 12 to which the hose is mounted.

The cover bracket 30 includes a cover portion 32. The cover portion 32 is illustrated in this embodiment as being substantially U-shaped; however, those skilled in the art will recognize that the cover portion 32 can be any shape that captures and contains the screw housing 26. For example, the cover portion 32 could be rectangular, semicircular or polygonal.

Figure 2:
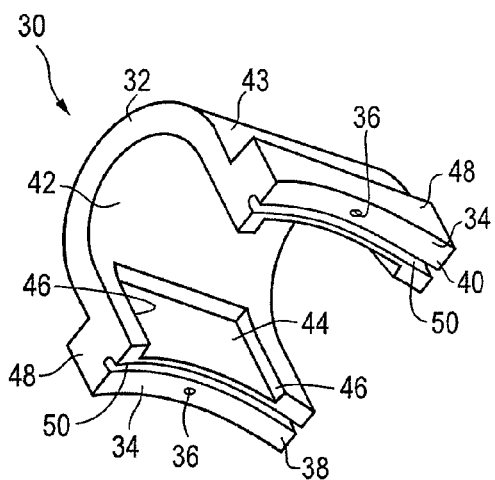
FIG. 2 illustrates a perspective view of a bracket in accordance with one embodiment of the invention prior to assembly with the hose.
Figure 3:
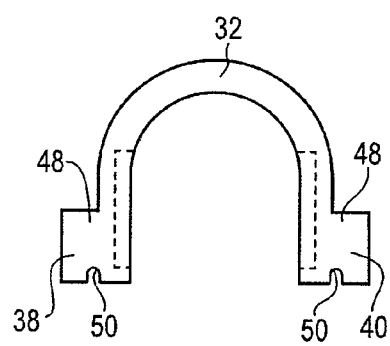
FIG. 3 illustrates a cross section of the bracket of FIG. 2.

Referring now to FIGS. 2 and 3, in one embodiment, the cover portion 32 includes inside surface 42 with a set-in portion 44. This set-in portion may be sized and shaped to contain the screw housing 26. As a result of forming the set-in portion 44 in the sidewalls 43, a stop 46 is formed on the inside of the front and back walls of the cover portion 32 which prevents the screw housing from moving inside the cover bracket 30. In this manner upon turning the screw 24, as a result of the detents of stops 46, the band is drawn through the screw housing 26 and the screw housing 26 does not move with respect to the cover bracket 30.

A base portion 48 including a bonding surface 34 extends from the cover portion 32. A deposit of an adhesive 36 is provided on the bonding surface 34 for securing the cover bracket 30 to the hose 10 as shown in FIG. 2. In this embodiment, the bonding surface is formed on two runners 38 and 40 which are spaced apart a distance that is approximately equal to the width of the band 22. Each runner may include a channel 50 located between the bonding surface 34 and the band. The channel 50 may be substantially parallel and proximate to the band. When the bonding surface is adhered to the hose, excess adhesive 36 may flow into the channels 50 rather than contaminating the screw 24 or the screw housing 26. In one embodiment, the channels 50 run the full length of the runners, such that if the adhesive 36 fills the channels 50, the excess adhesive is directed out the open ends of the channels 50 parallel to the band and distal from the screw mechanism.

Figure 4:
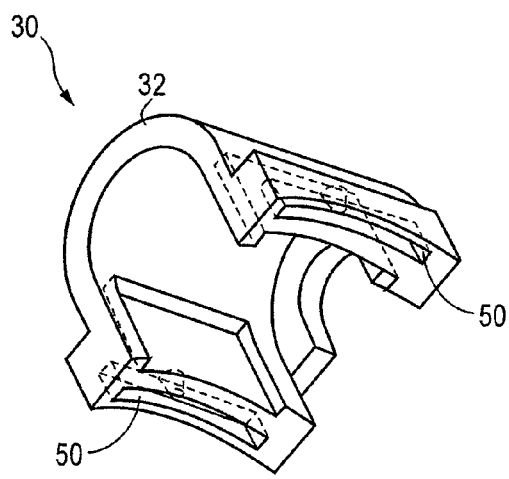
FIG. 4 illustrates a perspective view a bracket in accordance with a second embodiment of the invention prior to assembly with the hose.
Figure 5:
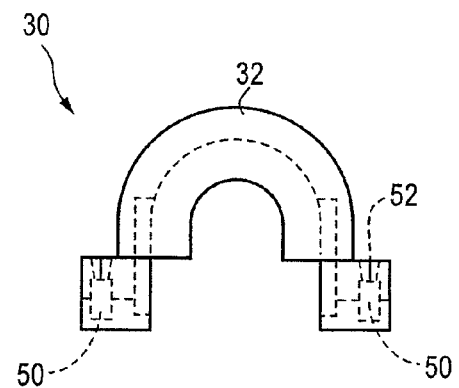
FIG. 5 illustrates a cross section of the bracket of FIG. 4.

Referring now to FIGS. 4 and 5, the channels 50 may also include an aperture 52. If the channels 50 fill with adhesive, the adhesive is directed through the aperture 52 to the exterior of the cover bracket 30 and away from the screw 24 and the screw housing 26. The aperture 52 may be tapered in shape, such that the diameter of the aperture 52 at the exterior of the cover bracket 30 is greater than the diameter of the aperture 52 within the channel 50.

As illustrated in FIG. 3, the bonding surface 34 may be slanted or angled, such that when the portion of the bonding surface 34 proximate to the cover portion 32 is in contact with the hose 10, a gap remains between the portion of the bonding surface 34 distal from the cover portion 32 and the hose 10. As the runners are pressed against the hose 10, the adhesive flows into the gap and away from the band 22 and the screw mechanism.

The cover bracket 30 can be formed from any suitable material; for example, it may be metallic, non-metallic, plastic, etc. The cover bracket 30 is formed from a hard plastic, and, still more particularly it is formed from an extrusion molded plastic such as nylon or high-density polyethylene (HDPE).

A variety of adhesives or glues may be used to secure the cover bracket 30 to the hose 10. One useful glue is a cyanoacrylate. Preferably an adhesive or glue is selected which cures rapidly to facilitate assembly of the cover bracket 30 and the clamp with the hose 10.

In the illustrated embodiment, the inside spacing of the sidewalls 42 is approximately equal to the width of the clamp 20. To assemble the clamp with the hose, the clamp 20 is placed over the end of the hose in the position in which the screw is accessible for installation. The cover bracket 30 is placed over the screw housing 26 with the adhesive deposits 36 on the runners 38 and 40 in contact with the outer surface of the hose 10. As the cover bracket 30 is pressed into place, any excess adhesive flows into the channels 50 or away from the screw mechanism due to the angled bonding surface of the runners. The cover bracket 30 is held in place, for example using a clamp, until the adhesive hardens.

In an alternate embodiment, the clamp may be assembled with the hose by placing the clamp 20 over the end of the hose in the position in which the screw is accessible for installation. The cover bracket 30 is placed over the screw housing 26. Adhesive 26 may be inserted through the apertures 52 such that the adhesive is between the runners 38 and 40 and the outer surface of the hose. As the cover bracket 30 is pressed into place, any excess adhesive flows into the channels 50 or away from the screw mechanism due to the angled bonding surface of the runners. The cover bracket 30 is held in place, for example using a clamp, until the adhesive hardens.

In another embodiment, the clamp may be assembled with the hose by feeding an adhesive through the aperture into the channel so that the adhesive fills the channel and then placing the cover bracket over the screw housing so that adhesive filled channel contacts the hose to adhere the cover bracket to the hose. The cover bracket may need to be held in place until the adhesive sets.

Those skilled in the art will recognize that the cover bracket of the invention is useful in any application in which it may be desirable to supply a clamp affixed to a hose. The hose may be a fuel fill hose, radiator hose, heater hose, etc.

Having described the invention in detail and by reference to specific embodiments thereof, it will be apparent that numerous modifications and variations are possible without departing from the spirit and scope of the following claims.

What is claimed is:

1. A cover bracket for holding a clamp having a screw housing in place on a hose without contaminating the screw housing with adhesive comprising:
   a cover portion configured to receive a screw housing;
   a first runner and a second runner connected to one another by the cover portion, each of the first and the second runners including a hose contacting surface;
   wherein the first runner includes a channel in the hose contacting surface, the channel having an aperture extending through the first runner to an exterior of the first runner.

2. The cover bracket of claim 1 wherein the aperture extends to an exterior surface of the first runner opposite the hose contacting surface.

3. The cover bracket of claim 1 wherein the aperture is tapered.

4. The cover bracket of claim 1 wherein the aperture is larger at the exterior surface than where the aperture enters the channel.

5. The cover bracket of claim 1 wherein the channel runs the full length of the first runner.

6. The cover bracket of claim 5 wherein the ends of the channel are open to the exterior of the first runner.

7. The cover bracket of claim 1 wherein the channel is positioned within the hose contacting surface such that hose contacting surface surrounds the channel.

8. The cover bracket of claim 1 wherein the hose contacting surface is angled such that when the hose contacting surface is pressed against a hose the adhesive is forced outward away from the screw and screw housing.

9. The cover bracket of claim 1 wherein the hose contacting surface is curved to fit against the curvature of a hose.

10. A method for attaching a cover bracket to a hose and clamp assembly comprising the steps of:
   a) providing a hose with a clamp having a band and a screw housing positioned thereon;
   b) providing a cover bracket comprising:
      a cover portion configured to receive the screw housing;

a first runner and an opposing second runner connected to one another by the cover portion;

wherein the first runner includes a hose contacting surface and a channel in the hose contacting surface, the channel having an aperture extending through the first runner to an exterior of the first runner;

c) placing the cover bracket over the screw housing so that the hose contacting surfaces of the first and second runners are in contact with the hose; and d) feeding an adhesive through the aperture so that the adhesive fills the channel.

11. The method of claim 10 further comprising the step of holding the cover bracket against the hose until the adhesive sets to adhere the cover bracket to the hose.

12. The method of claim 10 wherein the aperture is tapered for feeding the adhesive into the channel.

13. The method of claim 12 wherein the aperture is larger at the exterior surface than where the aperture enters the channel.

14. The method of claim 10 wherein the step of feeding the adhesive through the aperture is performed before the step of placing the cover bracket over the screw housing.

15. The method of claim 10 wherein the channel is positioned within the hose contacting surface such that the hose contacting surface surrounds the channel.

16. The method of claim 10 wherein the hose contacting surface is angled such that the adhesive is forced outward away from the screw and screw housing when placing the cover bracket over the screw housing.

17. The method of claim 10 wherein the hose contacting surface is curved to fit against the curvature of a hose.

* * * * *